April 7, 1931. H. HENSHAW 1,799,557
AUTOMATIC TRANSMISSION
Filed Sept 6, 1930 4 Sheets-Sheet 2
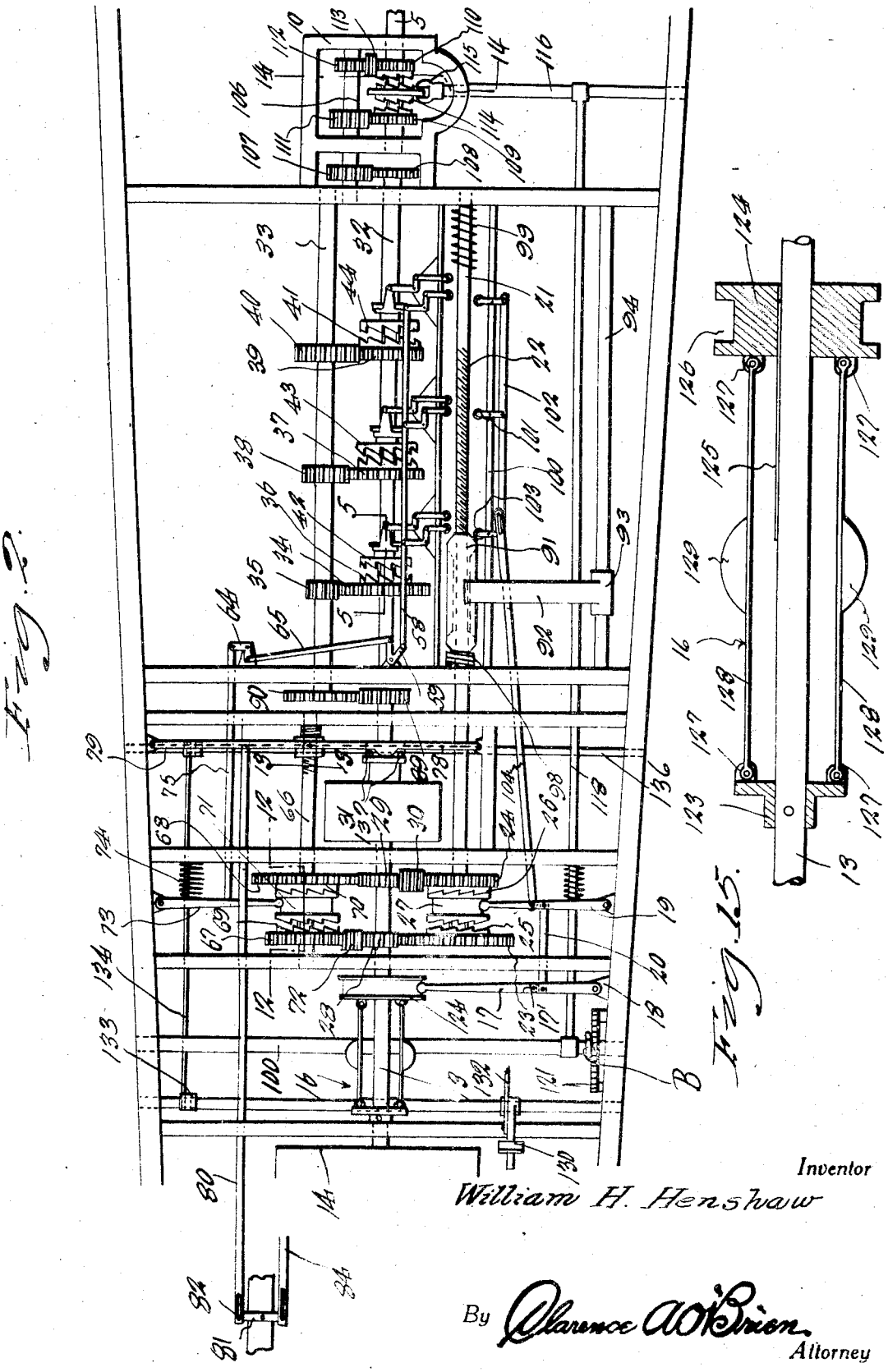
Inventor
William H. Henshaw
By Clarence A. O'Brien
Attorney

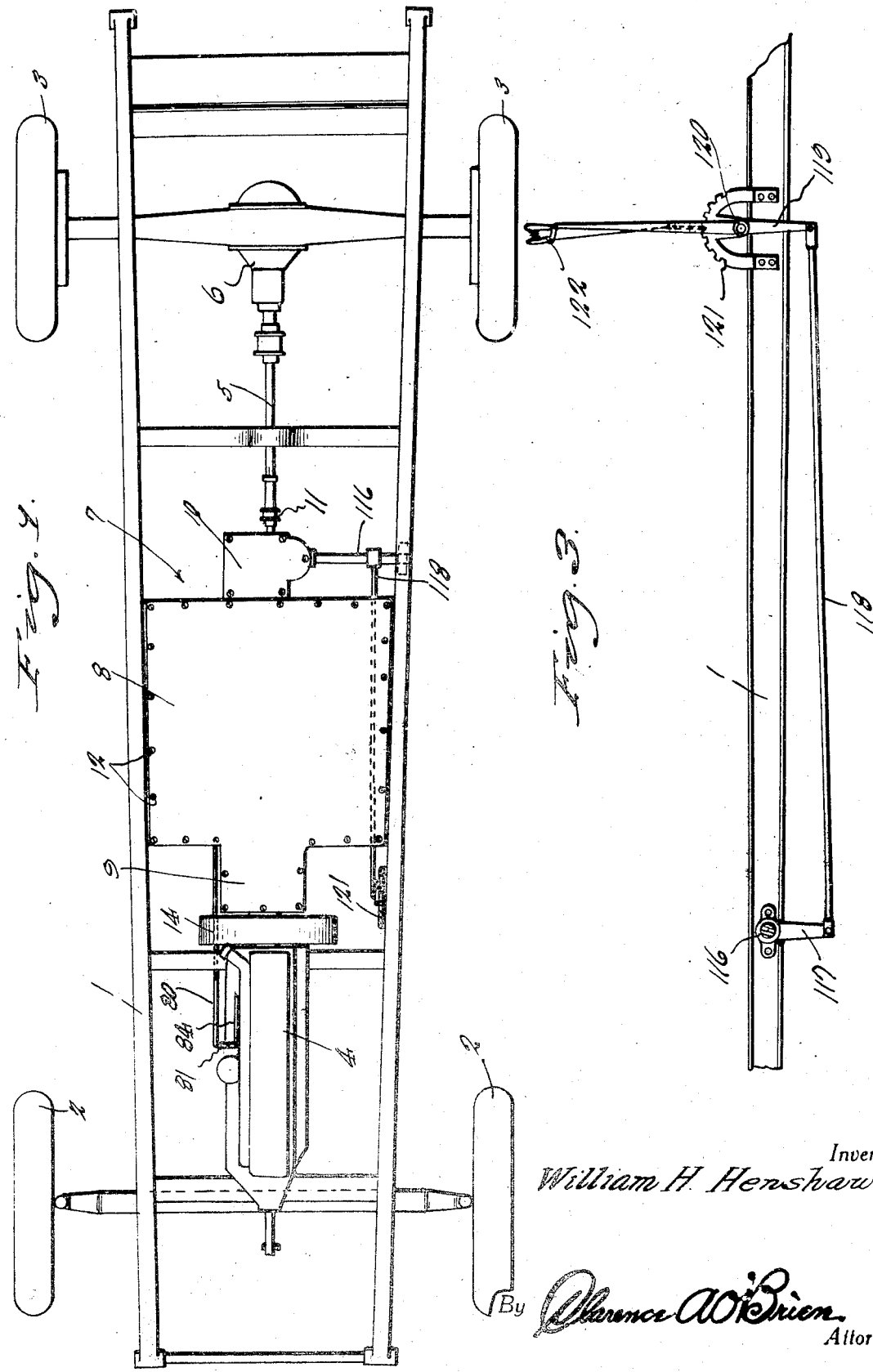

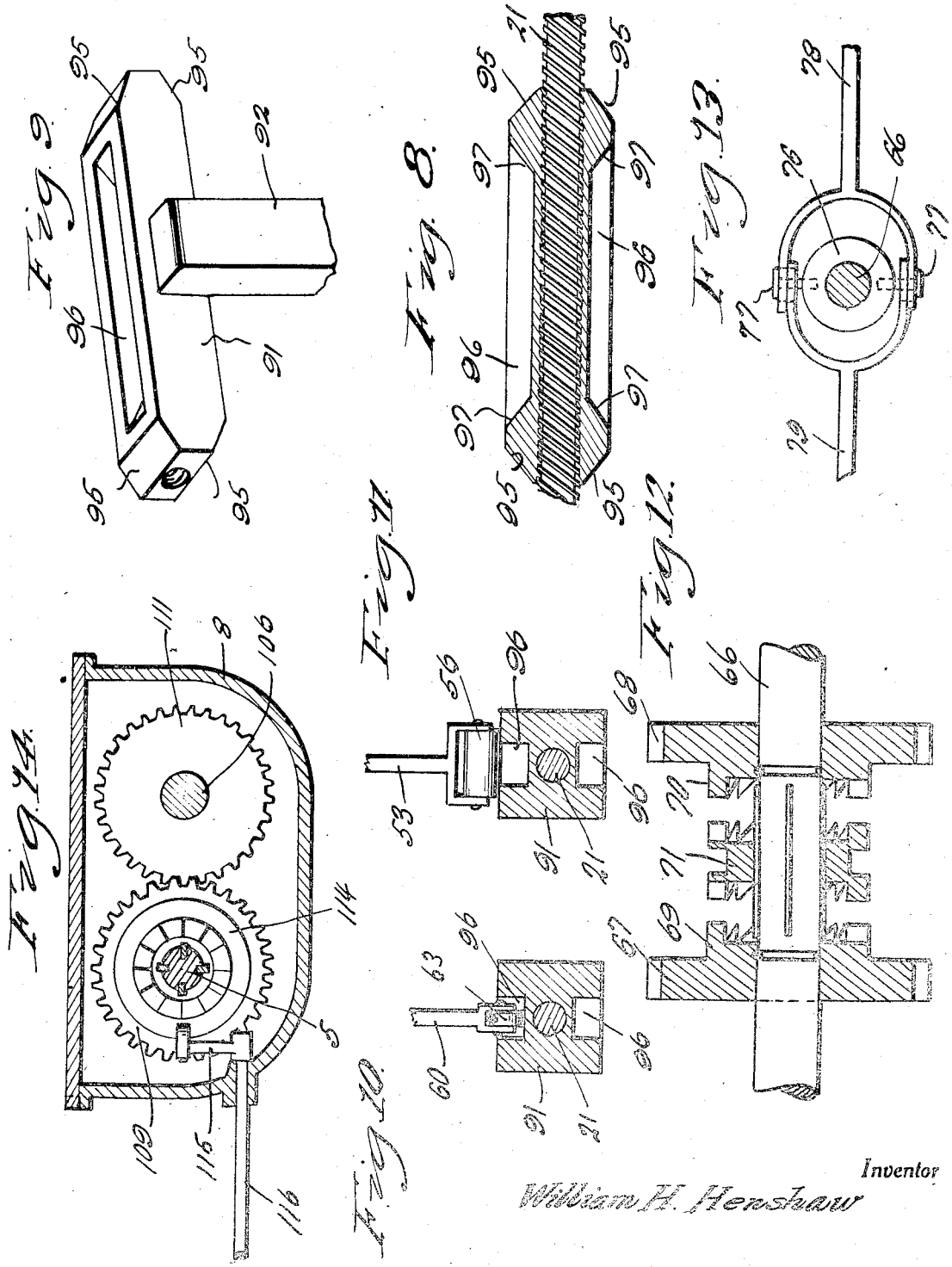

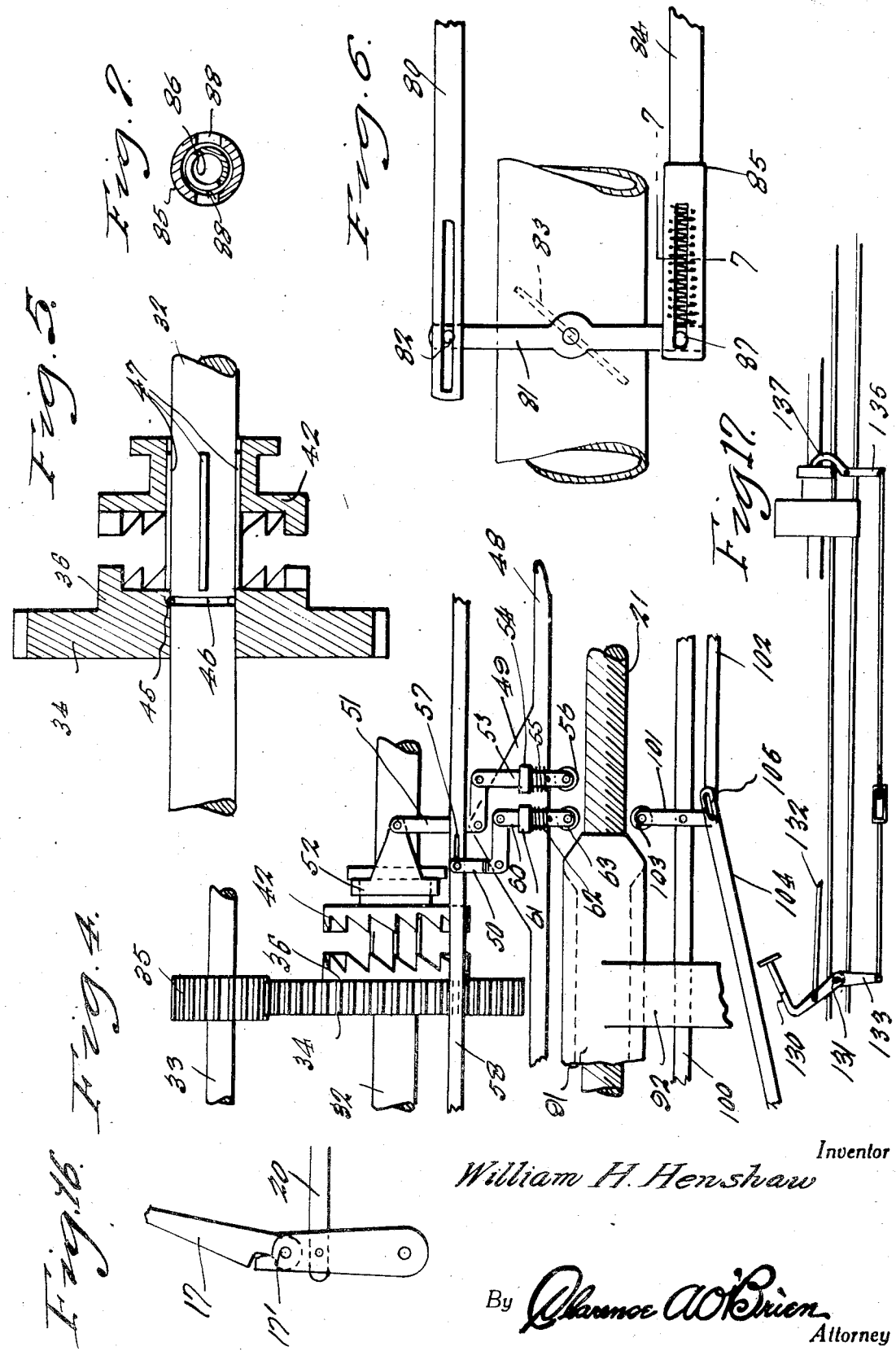

Patented Apr. 7, 1931

1,799,557

UNITED STATES PATENT OFFICE

WILLIAM H. HENSHAW, OF NORTH TARRYTOWN, NEW YORK

AUTOMATIC TRANSMISSION

Application filed September 6, 1930. Serial No. 480,215.

This invention relates generally to transmissions and more particularly to new and useful improvements in transmission for use in automobiles and has for its primary object to provide, in a manner as hereinafter set forth, a transmission which will be automatic in its operation.

Another important feature of the invention resides in the provision of novel means for automatically decellerating the engine of the automobile when the changes in speed are being effected.

Another important feature of the invention resides in the provision of novel means for preventing the functioning of the control governor when the speed of the engine is reduced when an automatic carburetor shut-off device constituting part of the invention functions during the speed change operations.

Other objects of the invention are to provide an automatic transmission of the character described which will be comparatively simple in construction, strong, durable, highly efficient in its use and which may be manufactured at low cost.

All of the foregoing and still further objects and advantages of the invention may become apparent from a study of the following specification, taken in connection with the accompanying drawings wherein like characters of reference designate corresponding parts as throughout the several views, and wherein:—

Figure 1 is a view in top plan showing a transmission constructed in accordance with this invention mounted in position in the chassis of an automobile.

Figure 2 is a view of the transmission with the housing removed therefrom.

Figure 3 is a view showing manually operable means for reversing the direction of travel of the automobile.

Figure 4 is a detail view in top plan on an enlarged scale showing the low or first speed gears and clutch together with the operating means for said clutch.

Figure 5 is a sectional view taken substantially on the line 5—5 of Figure 2.

Figure 6 is a detail view on an enlarged scale showing the connection of the operating rods to the carburetor throttle valve.

Figure 7 is a sectional view taken substantially on the line 7—7 of Figure 6.

Figure 8 is a longitudinal horizontal sectional view through the worm actuated clutch operating block.

Figure 9 is a detail view in perspective showing the clutch operating block.

Figure 10 is a cross sectional view through the clutch operating block showing one of the elements for operating the master clutch of the vehicle engaged therewith.

Figure 11 is a cross sectional view through the clutch operating block showing one of the elements for engaging the clutches of the change speed gearing in engagement therewith.

Figure 12 is a sectional view taken substantially on the line 12—12 of Figure 2.

Figure 13 is a detail cross sectional view taken substantially on the line 13—13 of Figure 2.

Figure 14 is a cross sectional view taken substantially on the line 14—14 of Figure 2.

Figure 15 is a longitudinal sectional view through the centrifugal governor.

Figure 16 is a detail view in side elevation showing the break join in the governor actuated lever.

Figure 17 is a view in side elevation showing the means for disengaging the master clutch through the medium of the foot brake pedal.

Referring to the drawings in detail and to Figure 1 thereof in particular, it will be seen that the reference numeral 1 designates the chassis of an automobile mounted on the front wheels 2 and the rear wheels 3 which are driven from the engine 4 through the usual drive shaft 5 and differential 6.

The transmission constituting this invention is mounted in the chassis 1 and interposed between the engine 4 and the propeller or drive shaft 5 and is designated generally by the reference numeral 7. The transmission comprises a housing of appropriate size designated by the reference numeral 8 and having an extension 9 projecting forwardly. A supplemental housing 10 is disposed on the and downwardly slanting rear wall M. The device for holding the stem 6 at the desired angle is indicated, in general, by the character 10. Said device is engaged by the rear wall M of the slot K and comprises an upper section 11, an intermediate section 12, and a lower section 13 which is adjustably connected to the section 12. The sections 11, 12 are hingedly connected, the hinge pin being indicated at 14. The adjustment between the sections 12, 13 is effected, in this instance, by a screw-threaded portion 15 of the section 13 screwed into the section 12.

A lock nut 16 on the threaded portion 15 engages the lower end of the section 12. The hinge pin 14 may be selectively engaged with any one of a number of holes 17 in the section 11 so as to provide for relatively great adjustments in the angle of the section 11 relative to the stem 6. The lower end of the section 13, which is in the form of a rod, is preferably rounded, as indicated at 18 and engages in a socket 19 formed in one side of the stem 6. The axis of the socket 19 is aslant upwardly relative to the longitudinal axis of the stem 6, and the angle of said slant is approximately 45 degrees relative to said axis. The diameter of the socket 19 is considerably greater than the diameter of the section 13, so that said section can properly seat in the socket when adjusted to different angles. The difference in angular positions of the section 13 occurs when the sections 12, 13 are relatively adjusted or when the hinge pin 14 is changed from one hole 17 to another of said holes. From the foregoing it will be readily seen that the device 10 for holding the stem 6 at the desired angle relative to the operating member is loosely connected at its lower end to the stem 6.

The upper end of the section 11 is pivoted or hinged at 20 to the upper portion of the stem 6.

In order to pivotally support the flexible member 8 on the operating member A, the upper end of the stem is provided with an eye 21 through which extends a U-bolt 22. The ends of the U-bolt 22 pass through slots 23 in a bearing member 24 which loosely rests on a bar 25 that seats at its end portions on the upper face of the operating member A.

Since the bearing member 24 loosely rests on the bar 25, the bar 25 is free to rock in a vertical plane transversely of the operating member A, so that, if the upper face of the operating member A be inclined to the horizontal, transversely of the operating member, as shown in Fig. 2, the pull of the flexible member 8 will come uniformly on both ends of the bar 25, thus preventing any tendency to canting to either side of the stem 6 and, thus, avoiding the production of bending strains in the stem. Thus, the U-bolt 22 has a two-fold function in that it pivotally connects both the flexible member 8 and the stem 6 to the bearing member 24.

To the ends of the bar 25 is pivoted at 26 a bail 27 which is adapted to rest upon the upper face of the operating member A when the horse head is in use. When it is desired to lift the horse head off of the operating member, the hoisting tackle, not shown, will be attached to the bail 27. The bail is secured to the operating member by any suitable means. The securing means, in this instance, is preferably adjustable so that the bail 27 can be secured in slightly different positions, thus to properly center the flexible member 8 relative to the axis of the polish rod, after the horse head has been mounted on the operating member.

The device, indicated at 28, for adjustably securing the bail to the operating member may be of any suitable construction and, in this instance, includes a flexible member 29 which is passed through the bail 27. It will be clear from the foregoing that, after the device 28 is secured to the operating member, the bail 27 may be shifted lengthwise of the operating member into the desired position and then secured in such position by the device 28 against outward movement along the operating member. The adjustment of the bail 27 on the operating member may entail that the upper end portion of the section 11 be removed from contact with the rear slot wall M, but in any event the lower end portion of said section 11 will engage said rear slot wall so as to hold the stem 6 at the desired angle relative to the operating member A. The center from which the arcuate faces 9 of the stem 6 are generated is the axis of the fulcrum B, and the flexible member 8 leaves the faces 9 at a tangent when the stem 6 is at the top and bottom of the pumping stroke, thus entailing that, once the horse head is correctly adjusted on the operating member so that the pull of the flexible member 8 on the polish rod will be axially thereof, said pull will be maintained throughout the stroke of the operating member.

In installing the invention, the hoisting tackle, not shown, will be secured to the bail 27 and the horse head will then be swung into a position to rest the bar 25 on the upper face of the operating member. The bail 27 will then be shifted along the operating member until the axis of the flexible member 8 adjacent to the point at which the flexible member is tangential to the stem 6 is exactly vertical over the axis of the polish rod.

The chain 29 will then be secured so as to hold the bail 27 in the position to which it has been adjusted.

It will be readily seen that if, on account of the fulcrum B of the operating member being not absolutely horizontal, or the upper face of the operating member not being in a horizontal plane transversely of the operating member, the bar 25 is not horizontal, the stem 6 will swing relative to the bar 25 so that said stem will lie in a plane that cuts through the axis of the polish rod. Thus there will be no bending strains on the horse head tending to break it or tending to cant it to either side so that the flexible member 8 will not track accurately in the groove 7.

If relatively great adjustments in the angle of the section 11 are necessary, to secure the correct angular relation between the stem 6 and the operating member, the end 14 will be changed from one of the holes 17 to the other. Other adjustments will be made by screwing the section 13 in or out of the section 12.

The member J is rotatably supported in a fork P which may be pivotally connected by a pin 30 to a pair of eyes 31 which terminate the lower end of the flexible member 8.

It is to be noted that the pump and rods may be pulled without removing the horse head from the beam. To accomplish this, the beam is tilted with its horse head-supporting end up, and then the section 13 is removed from the socket 19 and the sections 11, 12 are collapsed, thus permitting the stem 6 to swing toward the beam and away from a position axially of the polish rod.

By providing the grooved stem and the flat faces 9 on opposite sides of the groove 7, the chain is prevented from rotating about its axis. In other words, by this construction, the chain operates the same as a rod would in so far as the tendency to twisting or turning is concerned. In preventing turning of the chain, excessive wear on the U-bolt 22 and on the chain and stem and on the connections between the chain and grip G is minimized.

I claim:

1. A horse head, comprising a grooved stem, a means connected to the stem adapted to engage the rear wall of the slot in the operating member to which the stem is connected, a flexible member lying in the groove, and a means to pivotally support the flexible member and stem on the operating member.

2. A horse head, comprising a bar, a bearing member loosely mounted on said bar, a grooved stem, a flexible member lying in the groove, a means connecting the flexible member and stem to the bearing member, and a means connected with the stem adapted to engage the rear slot wall in an operating member to hold the stem against swinging in the upper portion of the stroke of the operating member.

3. A horse head, comprising a bar, a bail pivotally connected to the ends of said bar, a bearing member loosely mounted on said bar, a stem provided with a groove, a flexible member lying in the groove, a means connecting the flexible member and stem to the bearing member, and a means connected with the stem for engaging the rear wall of a slot in the operating member on which the bar is mounted.

4. A horse head, comprising a grooved stem provided with an eye at its upper end, a U-bolt engaging said eye, a flexible member lying in the groove and connected with the U-bolt, a bar adapted to rest on an operating member, a bearing member loosely mounted on said bar and secured to the U-bolt, and a means connected with the stem and engaging the operating member to hold the stem against swinging when the operating member moves in the upper part of the stroke.

5. A horse head, comprising a stem provided with an arcuate groove and provided at its upper end with an eye, a bar adapted to rest on an operating member, a bearing loosely mounted on said bar, a U-bolt extending through the eye and secured to the bearing member, a flexible member extending through the U-bolt and engaging the groove, and a device connected with the stem and adapted to engage the operating member to hold the stem against swinging when the operating member is moving in the upper portion of its stroke.

6. A horse head, comprising a stem provided with an arcuate groove, a section pivoted at its upper end to the stem, a means connecting the lower end of said section to the stem, said means including two relatively adjustable sections for regulating the angle of said first mentioned section, a flexible member lying in the groove, and a means to pivotally support the flexible member and the stem on the upper face of an operating member.

7. A horse head comprising a stem provided with a groove and with an arcuate face, a chain having some of its links in the groove and others resting against said face, a means to connect the chain to an operating member, and a means to hold the stem against swinging including a section pivotally connected at its upper end to the stem and adapted to extend aslant downwardly away from said stem and an adjustable connection between the lower end of said section and the stem.

8. A horse head comprising a stem provided with a groove and with an arcuate face, a chain having some of its links in the groove and others resting against said face, and a means to connect the stem and chain to an operating member including a section pivotally connected at its upper end to the stem and adapted to extend aslant downwardly away from said stem and an adjustable connection between the lower end of said section and the stem.

9. A horse head comprising a bar, a bail pivotally connected to the ends of said bar, a bearing member loosely mounted on said the strips 128. It will thus be seen that as the speed of rotation of the drive shaft 13 increases, the weights 129 will be swung outwardly by centrifugal force and the disk 124 will thus be drawn forwardly toward the element 123. The strips 128 are, of course, formed of resilient material and upon a decrease in the speed of rotation of the engine or the shaft 13, the disk 124 will be moved rearwardly.

Referring now to Figures 2 and 17 of the drawings it will be seen that the reference numeral 130 designates a foot brake pedal which is fixed on an intermediate portion of the shaft 131 which is journaled in the chassis 1. A brake rod 132 is operatively connected to the pedal 130 above the shaft 131. An arm 133 is also fixed to the shaft 131 and has pivotally connected with its free end portion one end of a rod 134 which has its other end pivotally connected to an arm 135 fixed on the rockable shaft 136 which is journalled on the chassis 1. Spaced, upstanding, arcuate fingers 137 are fixed on an intermediate portion of the rockable shaft 136 and have their free ends operatively engaged with the master clutch 31 in manner to disengage said master clutch when the brake pedal 130 is depressed for applying the brakes of the vehicle.

In operation, as the speed of the engine and the drive shaft 13 is increased, the governor 16 moves the lever 17 forwardly and the clutch 27 is engaged with the clutch 25 on the gear 23 in a manner to key said gear 23 to the shaft 21. This movement of the clutch 27 is accomplished through the medium of the lever 19 and the link 20. Upon rotation of the screw shaft 21 the block 91 moves rearwardly thereon and actuates the first bell crank lever 50, the roller 63 on the bar 60 which is connected to said first bell crank lever riding up the inclined surface 95 adjacent thereto in a manner to move the bar 58 forwardly, rock the bell crank 59, actuate the link 65, rock the bell crank 64, actuate the link 75 and the lever 73 and engage the clutch 71 with the clutch 69 on the gear 67. The shaft 66 is thus rotated in a manner to move the nut 76 forwardly and, through the medium of the lever 78, disengage the master clutch 31 and move the throttle valve 83 to or toward its closed position through the medium of the lever 79 and the rod 80. While this is occurring the first of the arms 101 is engaged with the opposite diagonal surface 95 of the block 91 in a manner to swing the said arm 101 and actuate the bar 102 which, in turn, prevents rearward swinging movement of the lever 19 and consequent disengagement of the clutch 27 from the clutch 25 through the medium of the link or bar 104.

When the throttle valve of the carburetor is automatically closed and the engine slowed down thereby, the governor 16 moves toward its inoperative position but the break joint 17' in the lever 17 prevents the lever 19 from being actuated through the link 20 in a manner to disengage the clutch 27 from the clutch face 25 during this return movement of the governor.

It will thus be seen that the engine has been decellerated by the engagement of the block 91 with the first of the bell crank levers 50 but the functioning of the governor 16 in a manner to disengage the clutch 27 from the clutch 25 when the engine is thus decellerated has been prevented.

The block 91 then engages the first of the bars 53 which actuates the first of the bell crank levers 51 and the roller 63 and 103 on the first of the bell crank levers 50 and the arms 101 drop into the longitudinal grooves 96 on the opposite vertical side walls of the block 91. When said rollers are engaged in the grooves the master clutch 31 is again engaged and the engine is permitted to again accelerate. When the block 91 actuates the first of the bell crank levers 51 the clutch 42 is engaged with the clutch 36 in a manner to couple the gear 34 to the shaft 32 and the shaft 32 is thus driven. As before explained, the shaft 33 is driven from the drive shaft 13 through the gears 89 and 90 when the master clutch 31 is engaged.

It will thus be seen that the clutch 42 is engaged with the clutch 36 to couple the low speed gear 34 to the shaft 32 while the master clutch 31 is disengaged and the engine has had its speed of operation decreased. The clutch 42 is maintained in engaged position with the clutch 36 against the tension of the coil spring 54 by reason of the fact that the roller 56 is too wide to drop into the grooves 96 on the adjacent side of the block 91, as seen in Figure 11. The block 91 next engages the rollers 63 and 56 which are associated with the intermediate or second speed gears and the operation is again repeated when the block 91 reaches the element which actuates the third or high speed gears. The pin and slot connection 57 through the medium of which the bell cranks 50 are connected to the bar 58 permits independent movement of said bar 58 in one direction. The pin and slot connection 105 also permits a reverse swinging movement of the arms 101 and the bar 122 independently of the link 104. When the clutch 43 is moved toward engaging position, the clutch 42 is disengaged and when the clutch 44 is moved toward engaging position, the clutch 43 is disengaged. This is accomplished by reason of the fact that the block 91 is of a length to permit the rollers 56 of one of the clutches to be disengaged therefrom as the roller 56 of the next clutch is engaged therewith. As before stated, the automobile may be caused to travel in a reverse direction by simply shifting the clutch 114 into engagement with the gear 110.

The connection between the brake pedal 130 and the master clutch 31 disconnects the engine when the brakes of the vehicle are applied and permits the vehicle to be stopped quickly when desired.

It is believed that the many advantages of a transmission constructed in accordance with this invention will be readily understood, and although the preferred embodiment of the invention is as illustrated and described, it is to be understood that changes in the details of construction may be had which will fall within the scope of the invention as claimed.

What is claimed is:—

1. A transmission of the character described comprising a housing, a propeller shaft, a drive shaft extending into the housing, said drive shaft operatively connected to an engine, a shaft mounted for rotation in the housing, clutch controlled means for releasably coupling the third named shaft to the drive shaft, another shaft mounted for rotation in the housing, means for releasably coupling the fourth named shaft to the propeller shaft, a screw shaft rotatably mounted in the housing, a series of clutch controlled device for operatively coupling the fourth named shaft to the third named shaft, a block threaded for longitudinal movement on the screw shaft for successively engaging and actuating the clutch controlled devices, for coupling the screw shaft to the drive shaft for actuation by said drive shaft.

2. A transmission of the character described comprising a housing, a propeller shaft, a drive shaft extending into the housing, said drive shaft operatively connected to an engine, a shaft mounted for rotation in the housing, clutch controlled means for releasably coupling the third named shaft to the drive shaft, another shaft mounted for rotation in the housing, means for releasably coupling the fourth named shaft to the propeller shaft, a screw shaft rotatably mounted in the housing, a series of clutch controlled devices for operatively coupling the fourth named shaft to the third named shaft, a block threaded for longitudinal movement on the screw shaft for successively engaging and actuating the clutch controlled devices, for coupling the screw shaft to the drive shaft for actuating by said drive shaft, means operatively engageable with the block for disengaging the first named clutch controlled means prior to the engagement of each of the clutch controlled devices, and means operatively connected to the last named means for decellerating the engine simultaneously with the disengagement of the first named clutch controlled means.

3. A transmission of the character described comprising a housing, a propeller shaft, a drive shaft extending into the housing, said drive shaft operatively connected to an engine, a shaft mounted for rotation in the housing, clutch controlled means for releasably coupling the third named shaft to the drive shaft, another shaft mounted for rotation in the housing, means for releasably coupling the fourth named shaft to the propeller shaft, a screw shaft rotatably mounted in the housing, a series of clutch controlled devices for operatively coupling the fourth named shaft to the third named shaft, a block threaded for longitudinal movement of the screw shaft for successively engaging and actuating the clutch controlled devices for coupling the screw shaft to the drive shaft for actuating by said drive shaft, means operatively engageable with the block for disengaging the first named clutch controlled means prior to the engagement of each of the clutch controlled devices, and means operatively connected to the last named means for decellerating the engine simultaneously with the disengagement of the first named clutch controlled means, the means for operatively connecting the screw shaft to the drive shaft comprising a pair of gears loosely mounted on the screw shaft, a gear fixed on the drive shaft engaged with one of the screw shaft gears for driving said gear in one direction, gears connected with the drive shaft and engaged with the other of the screw shaft gears for rotating the same in the opposite direction, clutches on the screw shaft gears, a clutch splined on the screw shaft and engageable with the gear clutches for selectively coupling said gears to the screw shaft, a pivoted lever engaged with the last named clutch for shifting the same, centrifugally actuating means mounted on the drive shaft and operatively connected to the lever for swinging said lever in opposite direction in a manner to couple one or the other of the screw shaft gears to the screw shafts.

4. A transmission of the character described comprising a housing, a propeller shaft, a drive shaft extending into the housing, said drive shaft operatively connected to an engine, a shaft mounted for rotation in the housing, clutch controlled means for releasably coupling the third named shaft to the drive shaft, another shaft mounted for rotation in the housing, means for releasably coupling the fourth named shaft to the propeller shaft, a screw shaft rotatably mounted in the housing, a series of clutch controlled devices for operatively coupling the fourth named shaft to the third named shaft, a block threaded for longitudinal movement of the screw shaft for successively engaging and actuating the clutch controlled devices for coupling the screw shaft to the drive shaft for actuating by said drive shaft, means operatively engageable with the block for disengaging the first named clutch controlled means prior to the engagement of each of the clutch controlled devices, and means operatively connected to the last named means for decellerating the engine simultaneously with the disengagement of the first named clutch controlled means, the means for operatively connecting the screw shaft to the drive shaft comprising a pair of gears loosely mounted on the screw shaft, a gear fixed on the drive shaft engaged with one of the screw shaft gears for driving said gear in one direction, gears connected with the drive shaft and engaged with the other of the screw shaft gears for rotating the same in the opposite direction, clutches on the screw shaft gears, a clutch splined on the screw shaft and engageable with the gear clutches for selectively coupling said gears to the screw shaft, a pivoted lever engaged with the last named clutch for shifting the same, centrifugally actuating means mounted on the drive shaft and operatively connected to the lever for swinging said lever in opposite direction in a manner to couple one or the other of the screw shaft gears to the screw shafts, and means mounted in the housing operable by the block for retaining the lever against swinging movement in one direction under the impulse of the centrifugal means.

5. A transmission of the character described comprising a housing, a propeller shaft, a drive shaft extending into the housing, said drive shaft operatively connected to an engine, a shaft mounted for rotation in the housing, a clutch controlled means for releasably coupling the third named shaft to the drive shaft, another shaft mounted for rotation in the housing, means for releasably coupling the fourth named shaft to the propeller shaft, a screw shaft rotatably mounted in the housing, a series of clutch controlled devices for operatively coupling the fourth named shaft to the third named shaft, a block threaded for longitudinal movement of the screw shaft for successively engaging and actuating the clutch controlled devices for coupling the screw shaft to the drive shaft for actuating by said drive shaft, means operatively engageable with the block for disengaging the first named clutch controlled means prior to the engagement of each of the clutch controlled devices, and means operatively connected to the last named means for decellerating the engine simultaneously with the disengagement of the first named clutch controlled means, the means for operatively connecting the screw shaft to the drive shaft comprising a pair of gears loosely mounted on the screw shaft, a gear fixed on the drive shaft engaged with one of the screw shaft gears for driving said gear in one direction, gears connected with the drive shaft and engaged with the other of the screw shaft gears for rotating the same in the opposite direction, clutches on the screw shaft gears, a clutch splined on the screw shaft and engageable with the gear clutches for selectively coupling said gears to the screw shaft, a pivoted lever engaged with the last named clutch for shifting the same, centrifugally actuating means mounted on the drive shaft and operatively connected to the lever for swinging said lever in opposite direction in a manner to couple one or the other of the screw shaft gears to the screw shafts, and means mounted in the housing operable by the block for retaining the lever against swinging movement in one direction under the impulse of the centrifugal means, said means comprising a series of pivotally mounted arms, a roller journaled for rotation on one end of each of the arms and engageable with the block, a bar pivotally connecting the opposite ends of each of the arms for swinging said arms simultaneously, and a rod having one end pivotally connected to an intermediate portion of the lever and its opposite end connected to the bar by a pin and slot connection.

In testimony whereof I affix my signature.

WILLIAM H. HENSHAW.